United States Patent Office 3,304,293
Patented Feb. 14, 1967

3,304,293
GAS PHASE POLYMERIZATION OF TETRAFLUOROETHYLENE
Robert Fuhrmann, Hanover Township, Morris County, and David Jerolamon, Morris Township, Morris County, N.J., assignors to Allied Chemical Corporation, New York, N.Y., a corporation of New York
No Drawing. Filed Mar. 6, 1962, Ser. No. 177,744
3 Claims. (Cl. 260—92.1)

This invention relates to the polymerization of tetrafluoroethylene at moderate temperatures and pressures, and more particularly to the polymerization of tetrafluoroethylene in the presence of a finely divided catalytic support which can act as a filler.

Several processes have been discovered in which tetrafluoroethylene can be polymerized to a high molecular weight polymer. One of these is the method described and claimed by Wheeler (United States Patent 2,847,391 of August 12, 1958). In this patent a technique is disclosed whereby homogeneous filled compositions of polytetrafluoroethylene can be obtained by utilization of a finely divided catalyst such as silica gel, silica clays, alumina impregnated with boric or phosphoric acid, granular magnesia, and hydrated orthosilicate at atmospheric pressure and at temperatures between —20° and 150° C. However the production rates fall off very sharply as the reaction is continued to high levels of polymer production such as 3:1 by weight of polymer:catalyst and higher.

We have found that upon limited admixture with salts of oxy acids of hexavalent chromium, such as magnesium chromate, commercial silica gels having surface area of at least 100 sq. meters per gram and average pore diameter of at least 40 A. catalyze the polymerization of tetrafluoroethylene at good rates over prolonged periods. We have also found that synthetic silica-alumina gels of like surface area and pore diameter and with similarly limited content of both alumina and chromium salt give similar good results as tetrafluoroethylene polymerization catalysts. In accordance with our invention, the sum of weights of aluminum and chromium, admixed with the silica gel, is about 1%–10% by weight based on the sum of the weights of the silica and the admixed alumina and chromium-containing salts.

By our process, the catalyst is homogeneously incorporated into the tetrafluoroethylene polymer and thus functions as filler. The product can accordingly be used directly in applications where a filler is desirable, such as in gasketing material. Moreover by our process the content of catalyst in the product can be reduced to 10% or less so that for many purposes the presence of the catalyst is immaterial. If desired the product of our process can be separated from the catalyst e.g. by dissolving the catalyst in hydrogen fluoride; or the product can be depolymerized to waxes which can then be separated from the support in molten state by filtration.

It is imperative that our catalyst be activated prior to use by drying it thoroughly in a dry gas such as air, suitably for approximately 15 hours, at a temperature of about 150° to 600° C. No polymerization of tetrafluoroethylene will occur if the catalyst is not initially activated. The degree of activation of the catalyst is dependent upon the temperature at which it is activated. The higher the temperature, the more active is the catalyst, up to the point of losing surface area by sintering. An activation temperature of about 400° C.–500° C. usually gives optimum results.

Although the polymerization of tetrafluoroethylene using our catalyst will proceed (after an initial induction period) at a good rate at room temperature, i.e. 15°–25° C., short induction periods and optimum rates are usually obtained in our process at temperatures of about 35°–70° C. Temperatures as low as —20° C. and as high as 150° C. can be used.

As above indicated, the weight of chromium to be added to our catalysts varies depending upon their content of aluminum. For example, the addition of 7 weight percent of $MgCrO_4$ to a silica-alumina catalyst of our invention, containing about a 90:10 weight ratio of silica: alumina (i.e. about 5.4% aluminum), we have found partially inhibits the polymerization reaction otherwise obtained with this catalyst, whereas improved rates are obtained with such catalyst containing about 0.03%–1% of chromium as $MgCrO_4$. On the other hand, we have found that addition of 15 percent $MgCrO_4$ to a straight silica gel in accordance with our invention greatly improves the polymerization rate over that for the pure silica gel.

Our invention is further illustrated by the following examples, in which the best mode contemplated by us for carrying out the invention is set forth.

The tetrafluoroethylene monomer used in the examples was kept in a cylinder surrounded by an aluminum sleeve whose diameter was about 2 inches wider than the cylinder. The entire system was kept in a box packed with Dry Ice, the temperature in the space between the aluminum sleeve and the cylinder being maintained at —30° to —40° C.

The tetrafluoroethylene cylinder was connected to a glass Y joint, one arm of which admitted dry nitrogen. The second arm of the Y led to a flowmeter, and then to one neck of a 500 ml. 3-necked flask. The gases passed out via another neck of the flask, fitted with a straight-bore air condenser, to a tube packed with glass wool, through a second flowmeter, and from there through a mineral oil bubbler to the hood chimney.

The center neck of the reactor carried a polytetrafluoroethylene stuffing box provided with a glass stirring rod with polytetrafluoroethylene stirring blade.

The polymerization catalyst used in the table below was prepared by adding to the gel an aqueous solution of magnesium chromate in amount to form a slurry and at concentration to provide the desired chromium content. The slurry was agitated at about 100° C. several hours, until the gel appeared dry; then the solids were crushed. The crushed material was activated by packing about 20 grams of it between glass wool plugs in a Pyrex tube, and inserting the tube into a tubular oven which was heated to about 400°. A thermocouple encased in a glass sleeve was used to measure the temperature of the catalyst during the heating.

The activation process was carried out first in an atmosphere of air and then in nitrogen. Both gases were pre-dried by passing them successively over anhydrous calcium sulfate and phosphorus pentoxide. A bubble counter was affixed to one end of the Pyrex activation tube.

After the desired flow rate of one bubble per second was set the catalyst was heated in air for 15–16 hours and then in nitrogen for 1–2 hours.

Following the activation the Pyrex tube was permitted to cool under nitrogen flow, then stoppered and placed in a "dry box," i.e. a large container swept by pure dry, oxygen-free nitrogen to exclude air.

A dry, stoppered reaction flask, complete with stirrer and stuffing box was also placed in the dry box and tared. It was then flushed with pure nitrogen and loaded with the activation catalyst and again weighed to give the weight of the catalyst by difference.

When removed from the dry box the reaction flask was rapidly connected to the source of tetrafluoroethylene. A good flow of pure nitrogen was started and the exit neck of the flask was then connected to the condenser. The flask was then immersed in a thermostat kept at the desired temperature and the nitrogen flow was decreased with a concomitant increase in tetrafluoroethylene flow. Once a flow of tetrafluoroethylene was established, the nitrogen was turned off and the starting time of the reaction was noted. To stop the reaction nitrogen was turned on, the tetrafluoroethylene was turned off, and a nitrogen purge of 5 minutes was then applied to the reaction flask. The reaction flask was then stoppered and weighed.

The results are presented in the following table wherein temperatures are in degrees centigrade and weight is in grams. The catalyst designated "Houdry S-65" is a commercial silica-alumina cracking catalyst (about 90:10 by weight silica:alumina; average pore diameter of about 40–50 A., surface area about 375 sq. meters per gram). That designated "Syloid G-72" is a commercial silica gel containing 99.2% silica (ignited basis); and having average pore diameter of about 120 A. and surface area about 370 sq. meters per gram.

catalyst surface and evaporated from hot spots into the gas phase.

While we have hereinabove described the preferred embodiments of the invention, it must be understood that departures may be made therefrom within the scope of the specification and claims.

We claim:
1. A process for polymerizing tetrafluoroethylene, comprising contacting gaseous tetrafluoroethylene with a catalyst selected from the group consisting of a mixture of silica gel having a surface area of at least 100 square meters per gram and an average pore diameter of at least 40 A. with a salt of an oxyacid of hexavalent chromium and a mixture of silica-alumina gel of the above-described surface area and pore diameter with a salt of an oxyacid of hexavalent chromium, the sum of the weights of aluminum and chromium in said catalyst being equal to about 1 to 10% by weight based on the sum of the weights of the silica, alumina and chromium-containing salts.

2. A process as claimed in claim 1 wherein magnesium chromate is present in the catalyst in amounts of at least 0.1% by weight and the reaction temperature is about 35 to 70° C.

3. A process as claimed in claim 1 wherein said catalyst is a mixture of a synthetic gel consisting essentially of about 90 parts by weight silica and about 10 parts by weight alumina with a quantity of magnesium chromate such that the chromium content is about 0.03–1% by weight based on the sum of the weights of the silica, alumina and magnesium chromate.

TABLE.—TETRAFLUOROETHYLENE POLYMERIZATION USING SILICA AND SILICA ALUMINA CATALYSTS

| Ex. | Catalyst | Activation | | | | Polymerization Temp. | Polymerization Time, Hrs. | Weight Catalyst | Weight Gain | Rate, g./g./hr. | Percent Polytetrafluoroethylene in Product |
|---|---|---|---|---|---|---|---|---|---|---|---|
| | | Air | | Nitrogen | | | | | | | |
| | | Hrs. | Temp. | Hrs. | Temp. | | | | | | |
| 1 | Houdry S-65 | 16 | 444 | 1.5 | 387 | 28±2 | 5.0 | 20.6 | 36.8 | 0.36 | 64.1 |
| 2 | Houdry S-65 | 16 | 449 | 1.5 | 390 | 49±1 | 5.0 | 20.6 | 28.0 | 0.27 | 57.6 |
| 3 | Houdry S-65 plus 0.1% MgCrO₄ | 15 | 510 | 1.5 | 400 | 26–34 | 5.0 | 19.8 | 42.0 | 0.42 | 68.1 |
| 4 | Houdry S-65 plus 0.1% MgCrO₄ | 15 | 500 | 1.5 | 400 | 25 / 49 | 0.25 / 5.75 | 19.9 | 50.3 | 0.42 | 71.6 |
| 5a | Syloid G-72 plus 15% MgCrO₄ | 16 | 500 | 2.0 | 400 | 48 | 5.0 | 11.9 | 14.6 | 0.24 | 55.0 |
| 5b | Syloid G-72 | 16 | 500 | 2.0 | 400 | 25 | 5.0 | 11.9 | 4.0 | 0.07 | 25.0 |

NOTE.—The very low rate in 5b above compared to the other runs shows the effectiveness of the alumina and/or chromium-containing salt additives in our catalysts.

*Example 6*

The runs above presented as Examples 1–5 were terminated after about 5 hours. The advantages of our catalyst can be illustrated by the following Example 6 which was run along the lines of Example 2 above but in larger scale and for 50 hours.

The catalyst of this example was the same as in Example 2, activated in dry air for 2 hours at 500° C., then 18 hours at 400° C., then in pure nitrogen 2 hours at 400° C., then cooled in pure nitrogen.

The catalyst (20.3 grams) was charged to a nitrogen-purged rotatable stainless steel vessel maintained at 50° C.±1° C. Pure nitrogen was charged to the evacuated vessel to a pressure of 5 p.s.i. and tetrafluoroethylene was then supplied continuously at pressure of 10 p.s.i. for the first 40 hours, dropping to 5 p.s.i. at the end of the run (50 hours) when the tetrafluoroethylene supply was shut off.

The recovered product weighed 211.3 grams, corresponding to production of 191 grams of polymer, i.e. 9.4 grams per gram of catalyst. The overall reaction rate for the 50 hour run was 0.188 gram of polymer formed per gram of catalyst per hour, i.e. was about two-thirds of the rate observed in the 5 hour run of Example 2.

In this example nitrogen diluent was used to moderate the reaction at the start in order to avoid local high temperatures which would fuse or char the product. Instead of such gaseous diluent, an inert liquid heat control medium can be used in our process either in amounts to slurry the catalyst, or in amounts to be adsorbed on the

References Cited by the Examiner

UNITED STATES PATENTS 2,843,502  7/1958  Fay _____ 260—41
2,847,391  8/1958  Wheeler _____ 260—41
2,981,727  4/1961  Boeke et al. _____ 260—94.9

OTHER REFERENCES

Keller, W. D.: Clays (Survey), in Encyclopedia of Chemical Technology, ed. by R. E. Kirk and D. F. Othmer, New York, Interscience Encyclopedia, vol. 4, 1949, p. 32.

JOSEPH L. SCHOFER, *Primary Examiner.*

MORRIS LIEBMAN, JAMES A. SEIDLECK,
*Examiners.*

K. B. CLARKE, J. A. DONAHUE, *Assistant Examiners.*